(12) United States Patent
Teramoto et al.

(10) Patent No.: US 6,469,842 B1
(45) Date of Patent: Oct. 22, 2002

(54) APPARATUS FOR PATTERNING A PHOSPHOR SCREEN, HAVING A MAIN LENS WITH FLAT ELEMENTS REPLACEABLE BY SUB-LENSES

(75) Inventors: Hiroshi Teramoto; Nobuyuki Zumoto; Shigeru Nishimoto; Takayuki Hirano, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 227 days.

(21) Appl. No.: 09/615,949

(22) Filed: Jul. 13, 2000

(30) Foreign Application Priority Data

Jul. 15, 1999 (JP) ............................. 11-201570

(51) Int. Cl.[7] .......................... G02B 3/00; G03B 41/00
(52) U.S. Cl. ......................... 359/800; 396/546
(58) Field of Search ................. 359/800, 819; 315/372; 348/482, 325, 380; 396/546, 547

(56) References Cited

U.S. PATENT DOCUMENTS 3,883,880 A  *  5/1975  Yamazaki et al. .......... 396/547
5,946,519 A  *  8/1999  Chao et al. ................. 396/546
6,380,667 B1 *  4/2002  Yokota et al. .............. 313/440

* cited by examiner

*Primary Examiner*—Georgia Epps
*Assistant Examiner*—Saeed Seyrafi
(74) *Attorney, Agent, or Firm*—Birch, Stewart, Kolasch & Birch, LLP (57) ABSTRACT

An apparatus for patterning a phosphor screen on the faceplate of a cathode-ray tube has a main lens that refracts light to simulate electron-beam trajectories. The main lens includes a fixed lens with a curved surface, and at least one replaceable flat element. The apparatus also has at least one sub-lens, with a curved surface, that can be substituted for the flat element to compensate for inaccurate simulation of the electron-beam trajectories. The flat element and the sub-lens have the same thickness, so that substitution of the one for the other does not produce an unintended shifting of light paths. Preferred sub-lenses include lenses having surfaces described by a bilaterally symmetric cosine function, and by a product of a sine function and a linear function.

11 Claims, 10 Drawing Sheets

$z(x,y) = a_3 \cdot x^2 \cdot y$

FIG.11
PRIOR ART

$z(x,y) = a_4 \cdot x \cdot y$

FIG.12
PRIOR ART

$z(x,y) = a_3 \cdot x^2 \cdot y$

FIG.13
PRIOR ART

$z(x,y) = a_3 \cdot x^2 \cdot y$ (35° ROTATION)

FIG.14
PRIOR ART $z(x,y) = a_4 \cdot x \cdot y$

$z(x,y) = a_1(1 - \cos(b_1 x))$

FIG.18

$z(x,y) = a_1(1 - \cos(b_1 x))$

FIG.19

$z(x,y) = a_2(\sin(b_2 x))y$

FIG.20

$z(x,y) = a_2(\sin(b_2 x))y$

APPARATUS FOR PATTERNING A PHOSPHOR SCREEN, HAVING A MAIN LENS WITH FLAT ELEMENTS REPLACEABLE BY SUB-LENSES

BACKGROUND OF THE INVENTION

The present invention relates to an improved apparatus for exposing a photosensitive coating on the faceplate of a cathode-ray tube to light to form a phosphor screen on the faceplate, the improvement relating to means for causing the light to follow simulated electron-beam trajectories more accurately.

Cathode-ray tubes (CRTs) are widely used at present to display images in television sets, computer monitors, and the like. The displayed image is created when the phosphor screen on the faceplate of the CRT is scanned by an electron beam emitted from an electron gun. In a color CRT, electron beams from different electron guns scan the screen simultaneously, landing on phosphors of different colors. To ensure that each beam lands on phosphors of the proper color, the phosphor screen is formed by exposing photosensitive phosphor materials to light through the slotted color separation mask through which the electron beams will also pass, using a main lens with a specially shaped surface that refracts the light into paths simulating the electron-beam trajectories.

If the electron beams do not land in the right positions, problems such as color smear may occur. The causes of beam-landing error include environmental factors such as the ambient temperature, and manufacturing-process factors such as misalignment of the electron guns. The manufacturing-process factors are difficult to eliminate completely, but fortunately, they can be compensated for.

One conceivable method of compensation would be to modify the surface figure of the main lens, or grind a new lens, whenever the manufacturing process was found to lead to beam-landing error. This approach is impractical.

A more practical method is to insert a corrective lens, referred to as a sub-lens, in the light path, either in front of or behind the main lens. A set of sub-lenses with different surface configurations can be prepared in advance, and inserted singly or in combination to compensate for various types of beam-landing error. A known set of sub-lenses is described in Japanese Unexamined Patent Application No. 10-83161.

The present inventors have found, however, that the sub-lenses in this known set fail to compensate for certain observed beam-landing patterns. Furthermore, the insertion of extra sub-lenses in the light path interferes with the simulation of electron-beam trajectories. Details will be given later. The overall result is that the prior art of beam-landing error compensation in the CRT manufacturing process lacks the desired degree of accuracy.

SUMMARY OF THE INVENTION

An object of the present invention is to compensate accurately for factors in the manufacture of a CRT that lead to beam-landing error on the phosphor screen of the CRT.

The invention provides an apparatus for exposing the faceplate of a cathode-ray tube to light, thereby patterning a phosphor screen on the faceplate. The apparatus includes a light source, and a lens group disposed between the light source and the faceplate. The lens group comprises a fixed lens having a curved surface that refracts light in simulated electron-beam paths, and at least one replaceable optical element. The replaceable optical element is normally a flat transparent plate, but the flat transparent plate can be replaced by a sub-lens having a curved surface, to compensate for inaccuracy of the simulated electron-beam paths. The flat transparent plate and the sub-lens have substantially the same thickness.

Due to their substantially equal thicknesses, the effect of the replacement of the flat transparent plate by the sub-lens is limited essentially to the effect of the curved surface of the sub-lens; no unintended shifting of light paths is produced by the flat body of the sub-lens. The sub-lens can accordingly compensate for a beam-landing error pattern without adversely affecting the overall simulation of electron-beam trajectories by the main lens.

The invention also provides two specific types of sub-lens. One has a cosine surface profile with bilateral symmetry. The other has a surface described by a mathematical function that includes a product of a linear factor in one coordinate and a sine factor in another coordinate. These sub-lenses compensate for beam-landing error patterns that are dealt with inadequately, or not at all, by the prior art.

DETAILED DESCRIPTION OF THE INVENTION

The invention and relevant prior art will now be described in relation to a CRT of the black-stripe type, with reference to the attached drawings. Like parts in different drawings are indicated by like reference characters.

First, exposure apparatus embodying the present invention and the prior art will be described.

Figure 1A:
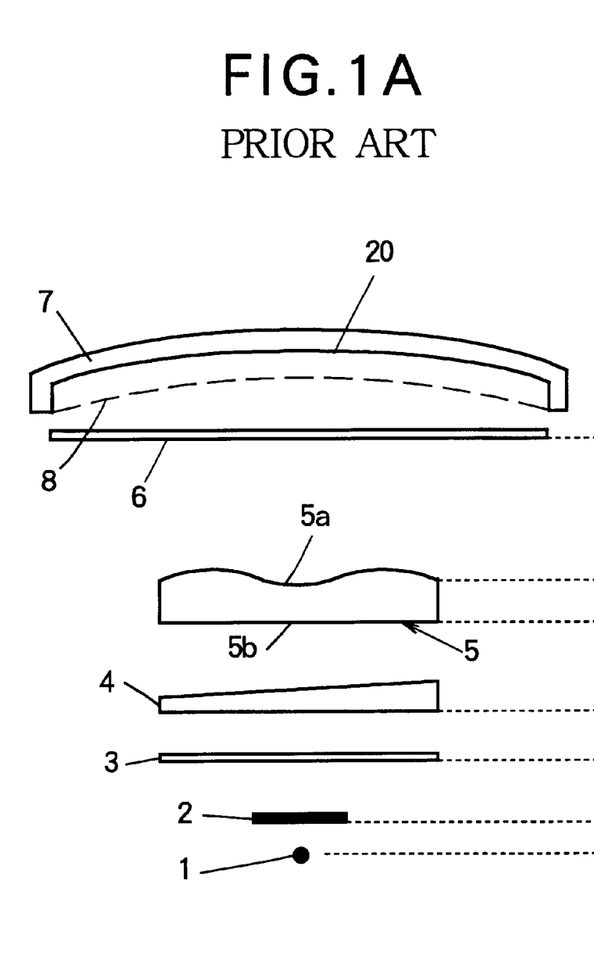
FIG. 1A is a schematic sectional drawing illustrating the prior art.

Referring to FIG. 1A, the prior-art apparatus comprises a light source 1, a shutter 2, an optical filter 3, a wedge lens 4, a main lens 5, and a rotating glass cover 6. The light source 1 is movable in the indicated x-direction to simulate the positions of different electron guns. When the shutter 2 is open, light from the light source 1 is irradiated onto the faceplate 7 of a CRT, through slots in a color separation mask 8. The optical filter 3 controls the flatness of the intensity distribution and wavelength distribution of the light on the faceplate surface. The wedge lens 4 adjusts the light paths from the light source 1 so that correct paths are obtained from the light source 1 in different positions. The wedge lens 4 has a cross-sectional shape that is tapered in the x-axis direction.

The x-axis direction is the horizontal direction both in the drawing and on the faceplate 7, when the CRT is viewed in its usual orientation, as shown later. The y-axis direction is the vertical direction on the faceplate 7 in its usual orientation. The z-axis direction is the direction of the optical axis of the apparatus, generally perpendicular to the faceplate 7 of the CRT.

The main lens 5 has an aspheric curved surface 5a facing the faceplate 7, and a flat surface 5b facing the light source 1. The curved surface 5a is described by a mathematical function $z(x, y)$ that is specially designed for simulation of electron-beam trajectories, and does not have a simple analytical expression.

The rotating glass cover 6 is a flat glass plate that, by rotating, averages out the effects of dust and the like during the exposure process.

Figure 2A:
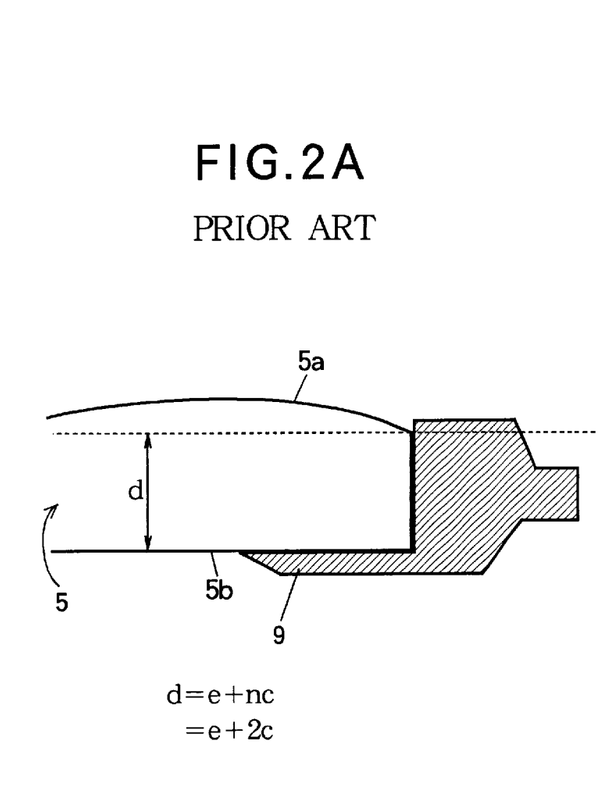
FIG. 2A is an enlarged sectional drawing illustrating the mounting of the main lens in FIG. 1A.

Referring to FIG. 2A, in the prior art, the main lens 5 is held fixed in a lens mount 9. The letter 'd' denotes the thickness of the flat part of the main lens 5, below the curved surface 5a. The full thickness of the main lens 5 is $z(x, y)+d$.

Figure 3A:
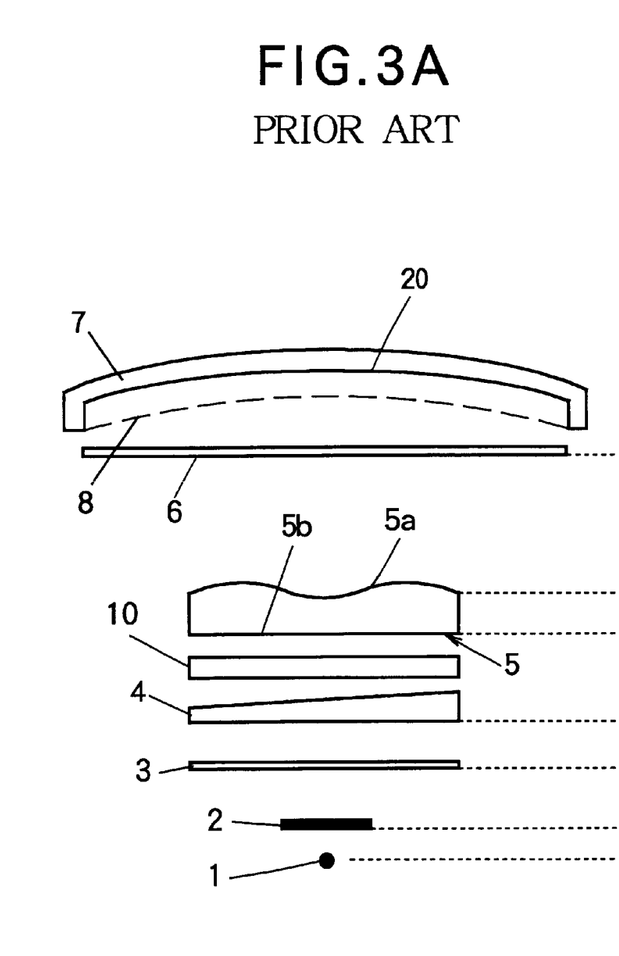
FIG. 3A is a schematic sectional drawing illustrating the insertion of a sub-lens in FIG. 1A.

Referring to FIG. 3A, in the prior art, a sub-lens 10 may be inserted between the wedge lens 4 and main lens 5 to compensate for beam-landing error. Details will be given later.

Figure 1B:
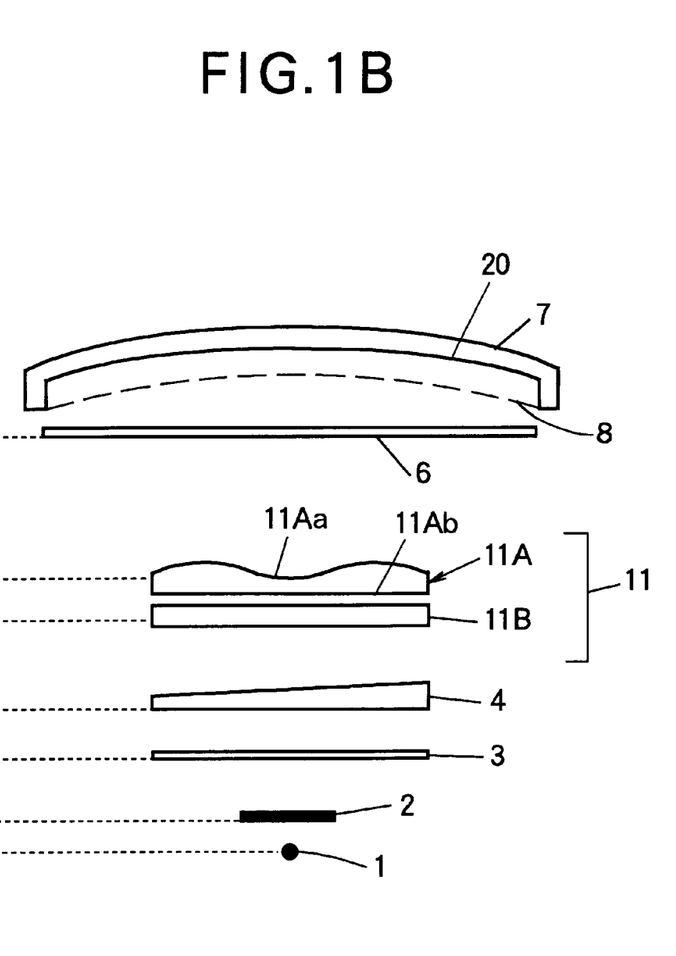
FIG. 1B is a schematic sectional drawing illustrating an embodiment of the invention.

Referring to FIG. 1B the invented apparatus comprises a light source 1, shutter 2, optical filter 3, wedge lens 4, and rotating glass cover 6 as in the prior art, but instead of a single fixed main lens 5, the invented apparatus has a main lens 11 comprising a comparatively thin fixed lens 11A and n replaceable flat transparent plates 11B, where n is a positive integer. For the sake of brevity, the flat transparent plates 11B will be referred to below as flat lenses. The fixed lens 11A has a curved surface 11Aa and a flat surface 11Ab.

Figure 2B:
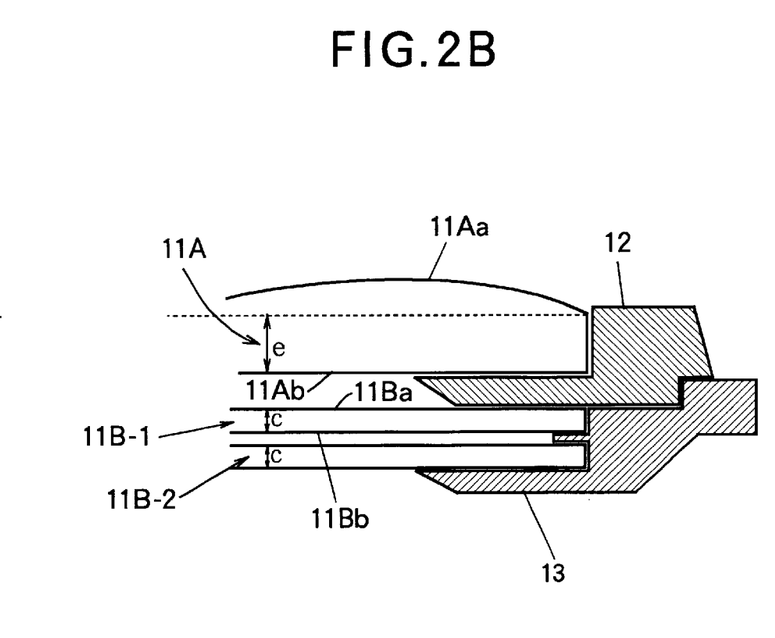
FIG. 2B is an enlarged sectional drawing illustrating the mounting of the main lens in FIG. 1B.

Referring to FIG. 2B, the fixed lens 11A is held in a fixed lens mount 12. The flat lenses are held in a replaceable lens mount 13, which is normally mounted in contact with the fixed lens mount 12, but can be detached from the fixed lens mount 12 for lens replacement. In FIG. 2B there are two flat lenses 11B-1, 11B-2 (n=2). There is a small air gap between the flat lenses 11B-1, 11B-2, and between the fixed lens 11A and the first flat lens 11B-1.

Each flat lens has two parallel flat surfaces 11Ba, 11Bb. Flat surface 11Ba has zero curvature, being described by the constant function $z(x, y)=0$. Each flat lens has the same constant thickness 'c' at all points. The letter 'e' denotes the thickness of the flat part of the fixed lens 11A, below the curved surface 11Aa. The thickness of the fixed lens 11A is $z(x, y)+e$, where $z(x, y)$ is the same function as used in the main lens 5 of the prior art.

Figure 3B:
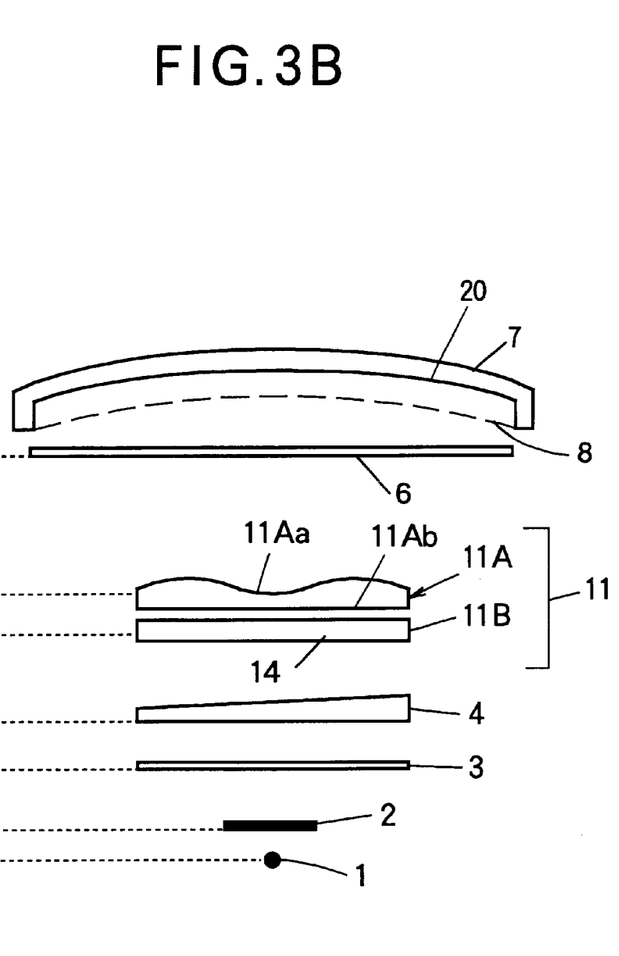
FIG. 3B is a schematic sectional drawing illustrating the replacement of part of the main lens in FIG. 1B with a sub-lens.

Referring to FIG. 3B, when it is necessary to compensate for beam-landing error in the manufacturing process, the invented apparatus replaces one or more of the flat lenses 11B with a sub-lens 14. In general k of the flat lenses 11B may be replaced by sub-lenses 14, so that k sub-lenses 14 and (n−k) flat lenses 11B are mounted in the replaceable lens mount 13 in FIG. 2B, where k is an arbitrary non-negative integer not exceeding n. For example, all n of the flat lenses 11B may be replaced by sub-lenses 14, so that the main lens 11 comprises only the fixed lens 11A, with no flat lenses 11B. Regardless of how many flat lenses 11B are replaced by sub-lenses 14, the total thickness of the lens group including the fixed lens 11A, flat lenses 11B (if any), sub-lenses 14 (if any), and wedge lens 4 remains essentially the same.

Next, the structure and formation of a phosphor screen 20 on the inner surface of the CRT faceplate 7 will described.

Figure 4A:
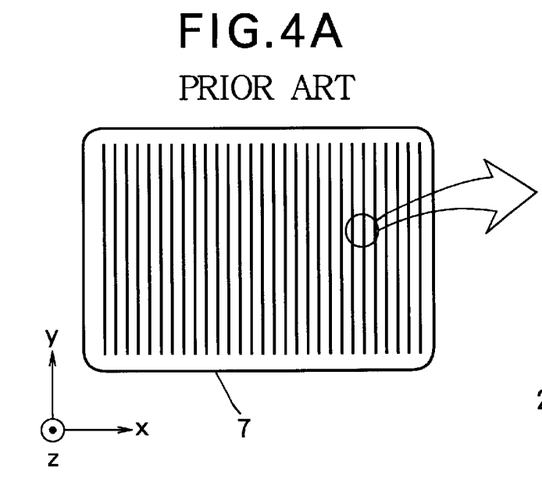
FIG. 4A illustrates the faceplate of a CRT with a black-stripe phosphor screen.
Figure 4B:
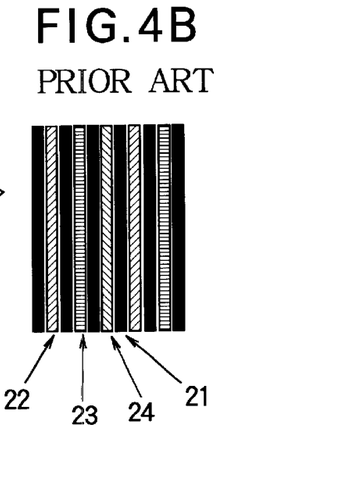
FIG. 4B is an enlarged view of part of the phosphor screen in FIG. 4A.

Referring to FIG. 4A, after the formation of the phosphor screen, the faceplate 7 has a vertically striped appearance. Referring to FIG. 4B, the stripes comprise a black matrix 21 and a repeating series of red phosphor stripes 22, green phosphor stripes 23, and blue phosphor stripes 24. The black matrix 21 separates phosphors of different colors from one another.

The color separation mask 8 is mounted in a fixed position a certain distance behind the faceplate 7. The color separation mask 8 is an electrode plate with equally spaced vertical slots. The CRT has three electron guns (not visible), which are mounted in-line, aligned side by side in the x-direction. During operation of the CRT, the electron beam from one gun passes through the slots of the color separation mask 8 and lands on the red phosphor stripes 22. The electron beams from the other two electron guns, passing through the same slots in the color separation mask 8, land on the green phosphor stripes 23 and blue phosphor stripes 24, respectively.

The process of forming the phosphor screen 20 comprises the steps of mounting the color separation mask 8, forming the black matrix 21, forming the red phosphor stripes 22, forming the green phosphor stripes 23, and forming the blue phosphor stripes 24.

To form the black matrix 21, after the color separation mask 8 has been mounted, the inner surface of the faceplate 7 is coated with a photoresist. The light source 1 of the exposure apparatus is moved to the position of the first electron gun and the shutter 2 is opened. The main lens of the apparatus refracts the light from the light source 1 in substantially the same way that the electron beam from the first electron gun will be refracted by magnetic or electrostatic fields during the operation of the CRT, so that after passing through the color separation mask 8, the light illuminates the part of the faceplate 7 on which the electron beam will land, this being the part where red phosphor stripes 22 are to be formed. Next, the shutter 2 is closed and the light source 1 is moved to the position of the second electron gun. When the shutter 2 is opened, the light from the light source 1 illuminates the part of the faceplate 7 on which green phosphor stripes 23 are to be formed. Next the shutter 2 is closed, the light source 1 is moved to the position of the third electron gun, and the shutter 2 is opened again to illuminate the faceplate 7 in the positions where the blue phosphor stripes 24 will be formed. When the photoresist is developed, the parts that have been illuminated remain, while the non-illuminated parts are removed. The inner surface of the faceplate 7 is now coated with the non-phosphorescent black-matrix material, and the remaining stripes of photoresist are lifted off, taking the unneeded matrix material with them and leaving the black matrix 21.

To form the red phosphor stripes 22, the inner surface of the faceplate 7, including the black matrix 21, is coated with a photosensitive red phosphor material. The light source 1 is moved to the position of the first electron gun, the shutter 2 is opened, and the faceplate 7 is illuminated through the slots in the color separation mask 8. Refracted by the main lens, the light again illuminates the landing sites of the electron beam from the first electron gun. The photosensitive red phosphor material is then developed with a chemical agent that removes the parts of the phosphor that have not been illuminated, but does not remove the illuminated parts. Red phosphor stripes 22 are thereby left in the appropriate locations.

The green phosphor stripes 23 are formed in a similar way, using a photosensitive green phosphor material, the light source 1 being moved to the position of the second electron gun. The blue phosphor stripes 24 are also formed in this way, using a photosensitive blue phosphor material, with the light source 1 moved to the position of the third electron gun.

Figure 5A:
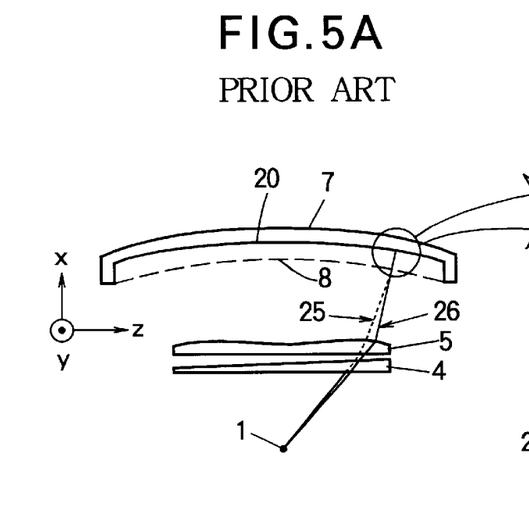
FIG. 5A illustrates the simulation of an electron-beam trajectory.

When the completed CRT is used for image display, as the electron beams are scanned across the faceplate 7, the beam from each electron gun, following substantially the same path as followed by the light from the light source 1 during the fabrication process, lands on phosphor stripes of the appropriate color. FIG. 5A compares the trajectory of the electron beam 25 and the path of the light 26 from the light source 1. The light source 1, wedge lens 4, and main lens 5 (or main lens 11) are of course not present in the completed CRT.

Figure 5B:
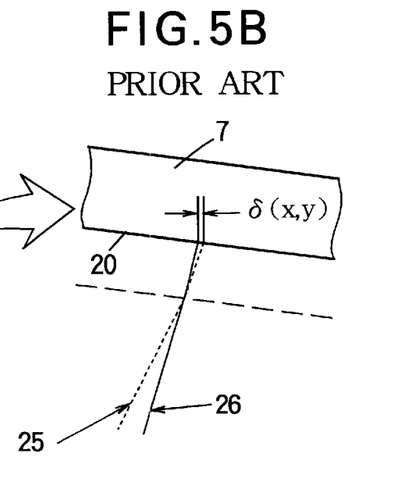
FIG. 5B illustrates beam-landing error.

For various reasons, as noted above, the light path 26 may not simulate the electron-beam trajectory 25 with perfect accuracy, in which case a beam-landing error occurs as shown in FIG. 5B. Only beam-landing error in the x-direction need be considered; beam-landing error in the y-direction can be ignored because the colors of the phosphor stripes 22, 23, 24 do not change in this direction. The landing error $\delta(x, y)$ is a function of the position $(x, y)$ on the faceplate 7. Experience has shown that most landing error patterns due to manufacturing-process factors can be approximately expressed by an equation of the following type, in which $h_1$, $h_2$, $h_3$, and $h_4$ are constants, and $u_x$ is the unit vector in the positive x-direction.

$$\delta(x, y)u_x = h_1 xy u_x + h_2 u_x + h_3 x^2 u_x + h_4 y u_x$$

FIGS. 6 to 9 illustrate the type of beam-landing error caused by each of the four terms in the equation above. Coordinates are expressed in a Cartesian coordinate system with its origin at the center of the faceplate, the positive x-direction extending to the right and the positive y-direction extending upward. The edges of the faceplate are at x=±240 mm and y=±140 mm. Beam-landing error vectors are indicated by arrows with lengths exaggerated by a factor of one thousand, for visibility.

Figure 6:
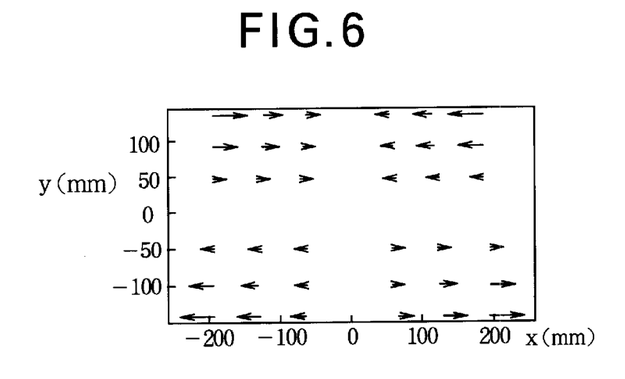
FIGS. 6, 7, 8, and 9 illustrate beam-landing error patterns on a CRT faceplate.

Referring to FIG. 6, the first term $h_1 xy u_x$ ($h_1 < 0$) produces a symmetrical slanted landing-error pattern in which the error vectors point inward in the upper half of the screen and outward in the bottom half of the screen.

Figure 7:
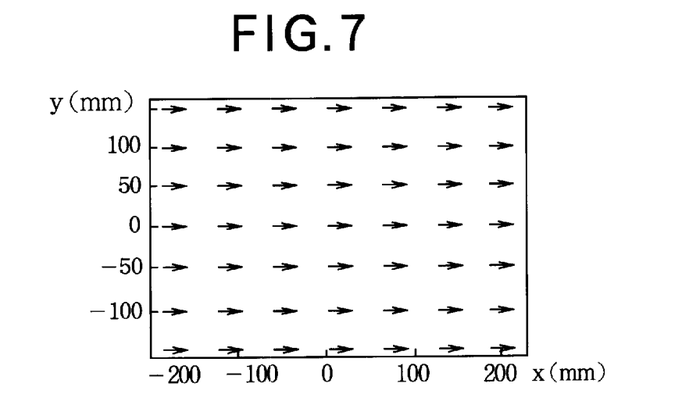

Referring to FIG. 7, the second term $h_2 u_x$ ($h_2 > 0$) produces a uniform horizontal shift. All beam-landing points are shifted by the same amount in the same direction.

Figure 8:
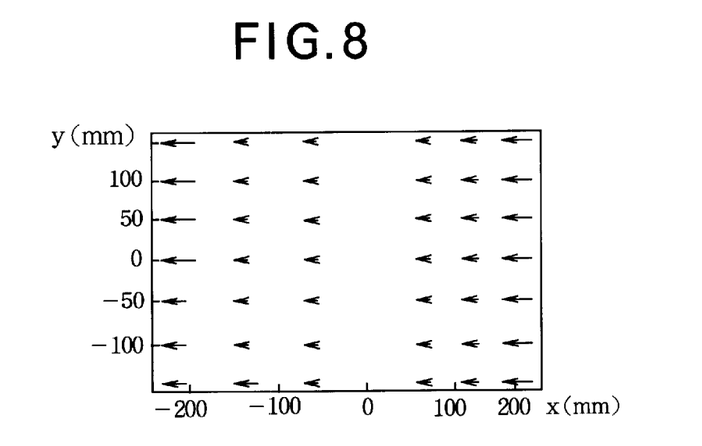

Referring to FIG. 8, the third term $h_3 x^2 u_x$ ($h_3 < 0$) produces a non-uniform shift pattern. All landing points are shifted in the same direction, but the magnitude of the landing error increases from the center toward the left and right edges of the screen. The magnitude of the error changes only with horizontal position, and not with vertical position.

Figure 9:
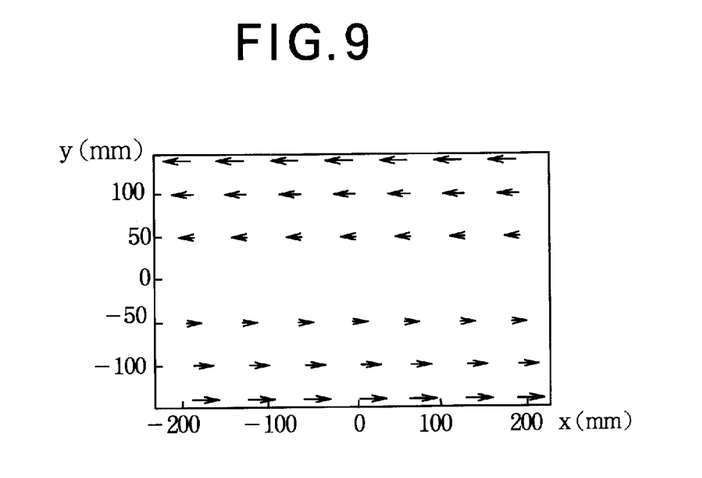

Referring to FIG. 9, the fourth term $h_4 y u_x$ ($h_4 < 0$) produces a shearing pattern. The landing error is positive in the lower half of the screen, zero at the center of the screen, and negative in the upper half of the screen, increasing in magnitude toward the top and bottom edges. The error magnitude changes only with vertical position, and not with horizontal position.

Although beam-landing error can be caused by subtle variations in manufacturing equipment and other factors that are difficult to predict in advance, once beam-landing error is observed to be occurring due to factors in the manufacturing process, it can be generally by analyzed as a combination of a limited number of patterns such as those above, and corrected by the use of a combination of sub-lenses, each designed to correct one of these patterns. A set of sub-lenses can be prepared in advance, for use as the need arises.

Figure 10:
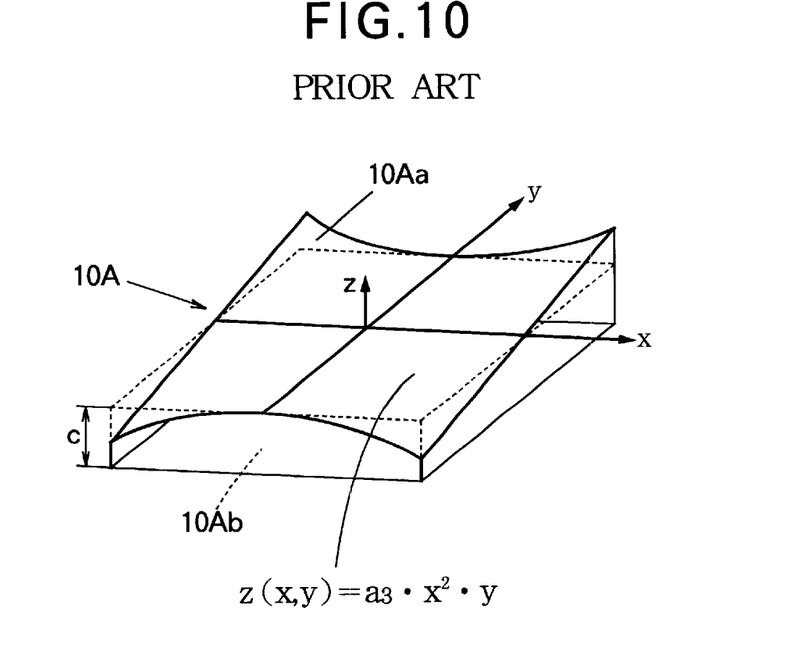
FIGS. 10 and 11 illustrate two sub-lenses used in the prior art.
Figure 11:
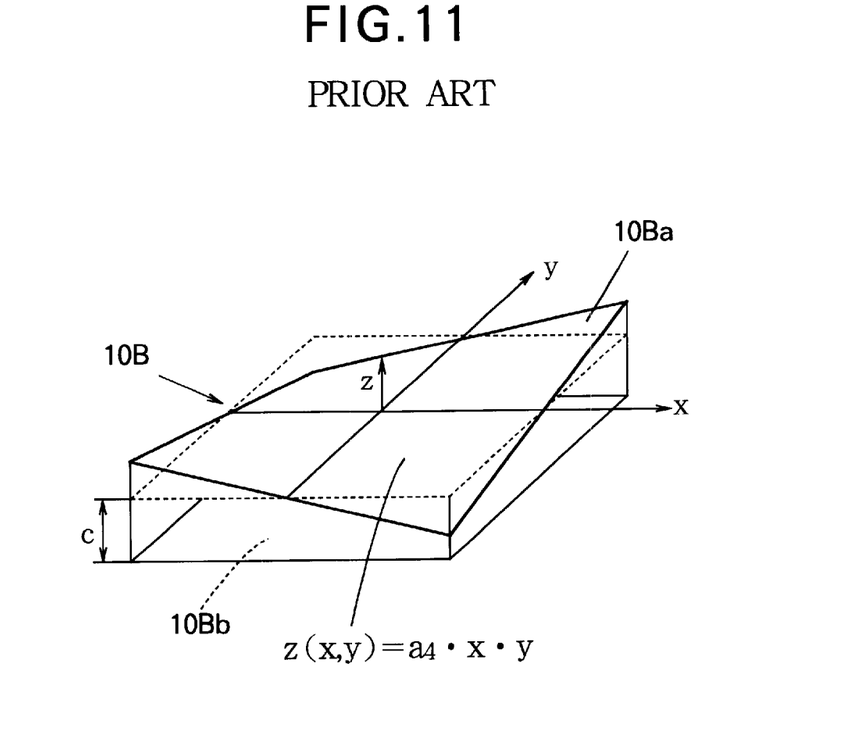

FIGS. 10 and 11 illustrate the sub-lenses disclosed in the prior art cited above. Both sub-lenses have the same mean thickness 'c'. Sub-lens 10A in FIG. 10 has an aspheric curved surface 10Aa and a flat surface 10Ab. The curved surface 10Aa is described by the following equation, in which $a_3$ is a constant.

$$z(x, y) = a_3 x^2 y$$

Sub-lens 10B in FIG. 11 has an aspheric curved surface 10Ba and a flat surface 10Bb. The curved surface 10Aa is described by the following equation, in which $a_4$ is a constant.

$$z(x, y) = a_4 xy$$

The thickness of sub-lens 10A at an arbitrary point $(x, y)$ is $a_3 x^2 y + c$, and the thickness of sub-lens 10B is $a_4 xy + c$.

Sub-lens 10A can be placed in different orientations to compensate for different beam-landing error patterns.

Figure 12:
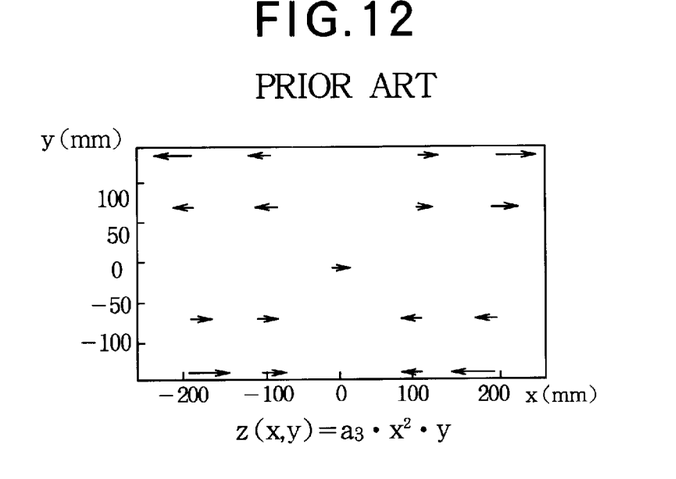
FIGS. 12 and 13 illustrate compensation patterns obtainable with the sub-lens in FIG. 10.

FIG. 12 shows an example of the calculated effect of sub-lens 10A when its x- and y-axes are oriented in the same directions as the x- and y-axes of the CRT faceplate 7. The x- and y-axes in FIG. 12 have the same meaning as in FIGS. 6 to 9, the edges of the CRT faceplate 7 being at x=±240 mm and y=±140 mm. The lengths of the compensation vectors are exaggerated by a factor of one thousand. In this orientation, sub-lens 10A compensates for the first-term symmetrical slanted beam-landing error pattern shown in FIG. 6.

Figure 13:
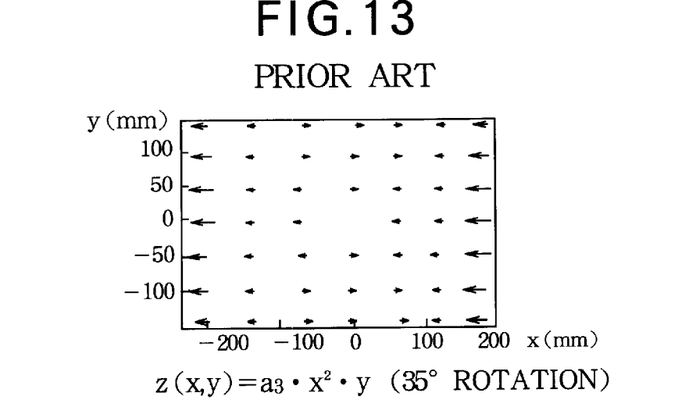

FIG. 13 shows an example of the calculated effect of sub-lens 10A when rotated through an angle of thirty-five degrees (35°) around the z-axis. The x- and y-axes in FIG. 13 are still parallel to the edges of the CRT faceplate 7, but are no longer parallel to the x- and y-axes of the sub-lens 10A. In this orientation, sub-lens 10A approximately compensates for the third-term beam-landing error pattern shown in FIG. 8.

Figure 14:
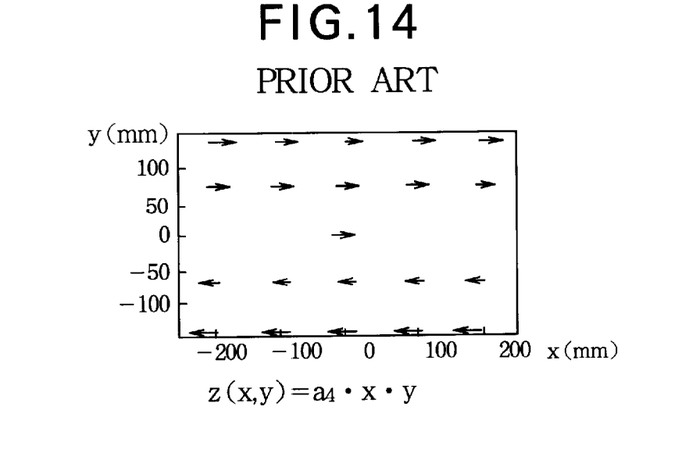
FIG. 14 illustrates a compensation pattern obtainable with the sub-lens in FIG. 11.

FIG. 14 shows an example of the calculated effect of sub-lens 10B when its x- and y-axes are parallel to the corresponding edges of the CRT faceplate 7. In this orientation, sub-lens 10B approximately compensates for the fourth-term beam-landing error pattern shown in FIG. 9.

In the prior art, compensation for a beam-landing error pattern that combines the effects of the first, third, and fourth terms of the equation given above is achieved by inserting a corresponding combination of sub-lenses of the types shown in FIGS. 10 and 11, rotated through suitable angles around the z-axis. Compensation for the effect of the second term of the equation, which shifts all beam-landing points equally in the same direction, is achieved by shifting the position of the light source 1.

Figure 15:
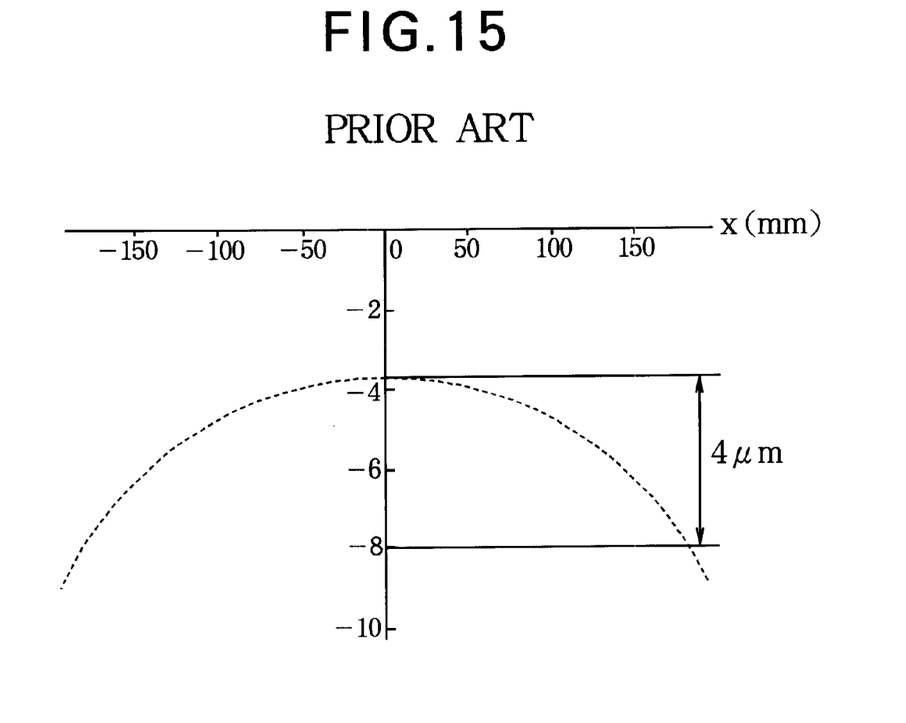
FIG. 15 is a graph illustrating compensation error in FIG. 14.

A comparison of FIGS. 9 and 14, however, reveals a major inaccuracy in the prior-art compensation for the fourth-term landing-error pattern or shearing pattern. In FIG. 9, the landing error at the top and bottom edges of the faceplate 7 (y=±140 mm) has a uniform magnitude, but the compensation magnitude in FIG. 14 increases from the midpoints (x=0) of these edges toward points (x=±200 mm) near the corners. The calculated compensation values at the top edge of the faceplate 7 (y=+140 mm) are shown in FIG. 15. The horizontal axis in FIG. 15 indicates position on the top edge in millimeters; the vertical axis indicates the calculated compensation in micrometers ($\mu$m). There is a difference of about four micrometers (4 $\mu$m) between the compensation value at the center of the top edge (x=0) and the value at the 180-millimeter points (where x=±180 mm). This 4-$\mu$m difference, although less than the width of the vertical black stripes forming the black matrix 21, is not so small as to be negligible.

Figure 16:
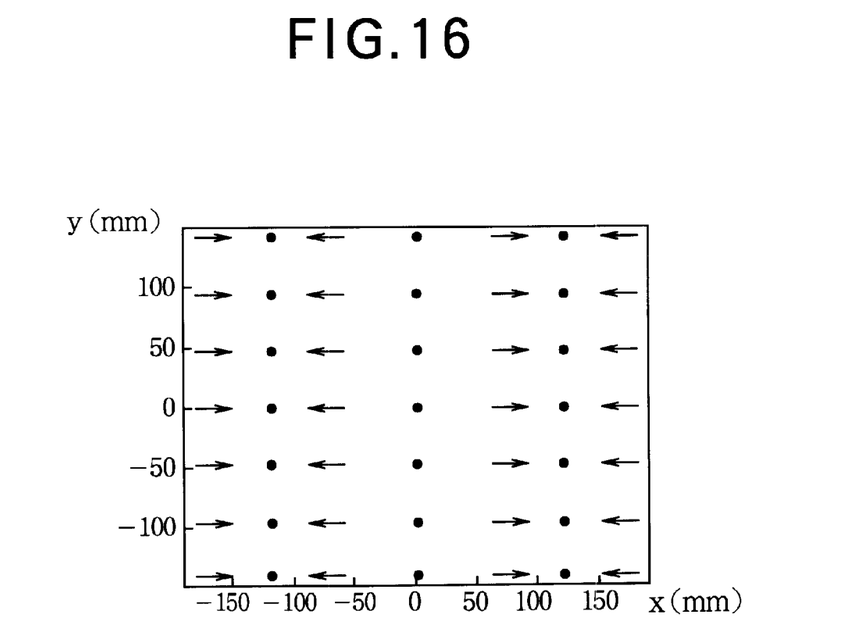
FIG. 16 illustrates another beam-landing error pattern.

The inventors have also found that beam-landing error sometimes occurs in a pattern that cannot be corrected by any combination of the sub-lenses 10A, 10B used in the prior art. Referring to FIG. 16, this is a pattern in which the direction of the error reverses as the beam moves outward from the center toward the right and left edges of the CRT faceplate. In FIG. 16, the error vectors point outward in the vicinity of x=±100 mm, but point inward in the vicinity of x=±150 mm. The pattern is bilaterally symmetrical with respect to x=0, and the error magnitude varies only with the x-coordinate, not with the y-coordinate. The error vectors in FIG. 16 are also exaggerated by a factor of one thousand.

The above are not the only inaccuracies found in the prior art. The insertion of sub-lenses 10, having a thickness of several millimeters each, between the wedge lens 4 and the main lens 5, shifts the paths of light from the light source 1 in an unintended manner before the light reaches the flat surface 5b of the main lens 5. This shift occurs because the light is not, in general, traveling parallel to the optical axis of the apparatus, an effect due in part to the wedge lens 4, and necessary for the simulation of electron-beam trajectories. The shift is caused by the thickness of the sub-lenses 10, not by the curved surfaces of the sub-lenses; insertion of a flat lens of the same thickness 'c' would lead to the same shift. As a result of the shift, the carefully calculated configuration of the curved surface 5a of the main lens 5 is rendered invalid; the main lens 5 no longer simulates electron-beam refraction in precisely the calculated manner.

This problem could be solved by placing the sub-lenses between the main lens 5 and the rotating glass cover 6, but then light paths would be distorted by the main lens 5 before the light reached the curved surfaces of the sub-lenses, and the sub-lenses would not function precisely as intended.

In the present invention, this problem is eliminated by substituting the sub-lenses 14 for part of the main lens 11, as indicated in FIG. 3B, instead of inserting sub-lenses in front of or behind the main lens.

Referring again to FIG. 2B, when n flat lenses 11B are mounted in the replaceable lens mount 13, the flat lenses and the fixed lens 11A function as if they were a single lens with a thickness equal to the sum of the thicknesses of the component lenses. The total effective thickness of the flat part of the main lens 11 in this case is the same as in the prior art (d=e+nc). The height of the curved surface 11A$a$ of the fixed lens 11A is also the same as the height of the curved surface 5$a$ of the main lens 5 in the prior art.

The lower surface of the bottom flat lens 11B-2 is lower than the lower surface of the main lens 5 in the prior art, but the position of the wedge lens 4 is the same as in the prior art. That is, the distance from the lower surface of flat lens 11B-2 to the wedge lens 4 is reduced in the invented apparatus, as compared with the distance from the lower surface 5$b$ of the main lens 5 to the wedge lens 4 in the prior art. Conceptually, the lens group comprising the fixed lens 11A, n flat lenses 11B, and the wedge lens 4 in the invented apparatus can be derived from the lens group comprising the main lens 5 and wedge lens 4 in the prior art by slicing the lower part of the prior-art main lens 5 into n parallel transparent plates, and moving these parallel plates slightly downward by various amounts, parallel to the optical axis.

Geometric optics teaches that the parallel motion of a parallel plate in a lens group does not change the optical properties of the lens group as a whole; light paths remain the same in length, and light rays emerge from the lens group in the same position and direction as if the parallel plate had not been moved. Thus when n flat lenses 11B are mounted in the replaceable lens mount 13, the main lens 11 of the invented apparatus is an exact optical equivalent to the main lens 5 in the prior art.

If beam-landing error is found to occur, the invented apparatus, like the prior art, uses one or more sub-lenses to compensate for the error. The replaceable lens mount 13 is detached from the fixed lens mount 12, one or more flat lenses 11B are removed, and sub-lenses 14 are installed in their place; then the replaceable lens mount 13 is reattached to the fixed lens mount 12. The sub-lenses 14 are selected from a prepared set of sub-lenses that includes both sub-lenses of a type used in the prior art and other sub-lenses that will be described below. Different sub-lenses have different curved surfaces, but each sub-lens 14 has the same mean thickness 'c' as the flat lenses 11B.

The substitution of sub-lenses 14 for flat lenses 11B alters light paths in the lens group comprising the main lens 11, sub-lenses 14, and wedge lens 4, but the alteration is due almost entirely to the curved surfaces of the sub-lenses 14. There is no extra shifting of light paths due to the mean thickness 'c' of the sub-lenses, because this thickness is substantially equal to the thickness of the flat lenses 11B replaced by the sub-lenses 14. It is also significant that the sub-lenses 14 are disposed closer to the upper surface 11A$a$ of the main lens 11 than in the prior art, as can be seen by comparing FIGS. 3A and 3B. For both of these reasons, light rays refracted by a sub-lens in the invented apparatus deviate less from their original position at the surface of the main lens 11 than do the same light rays refracted by the same sub-lens in the prior art. The overall accuracy of compensation is thereby improved.

Figure 17:
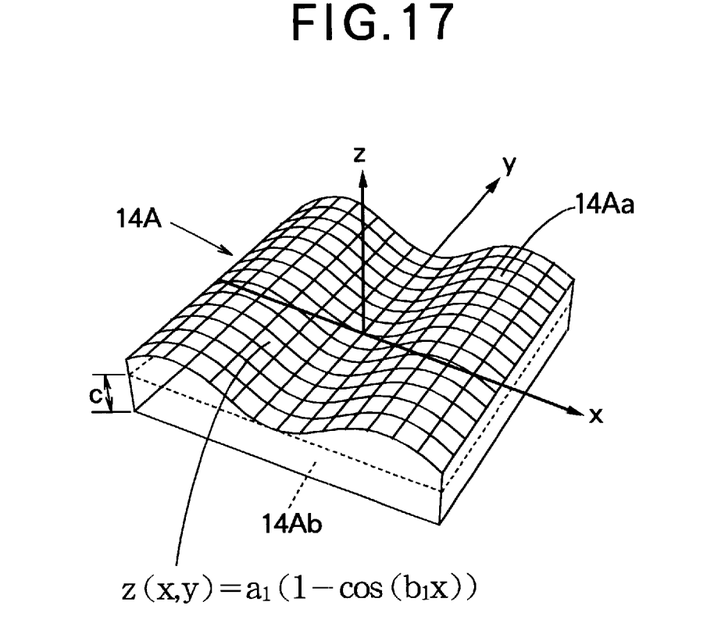
FIG. 17 illustrates a sub-lens compensating for the beam-landing pattern in FIG. 16.

FIG. 17 shows a novel sub-lens 14A employed in the invented apparatus. The upper surface 14A$a$ of this sub-lens 14A has a bilaterally symmetrical configuration described by the following cosine function, in which $a_1$ and $b_1$ are constants.

$$z(x, y) = a_1(1 - \cos(b_1 x))$$

The lower surface 14A$b$ is flat. The thickness of sub-lens 14A at a point (x, y) is $a_1(1-\cos(b_1 x))+c$.

Figure 18:
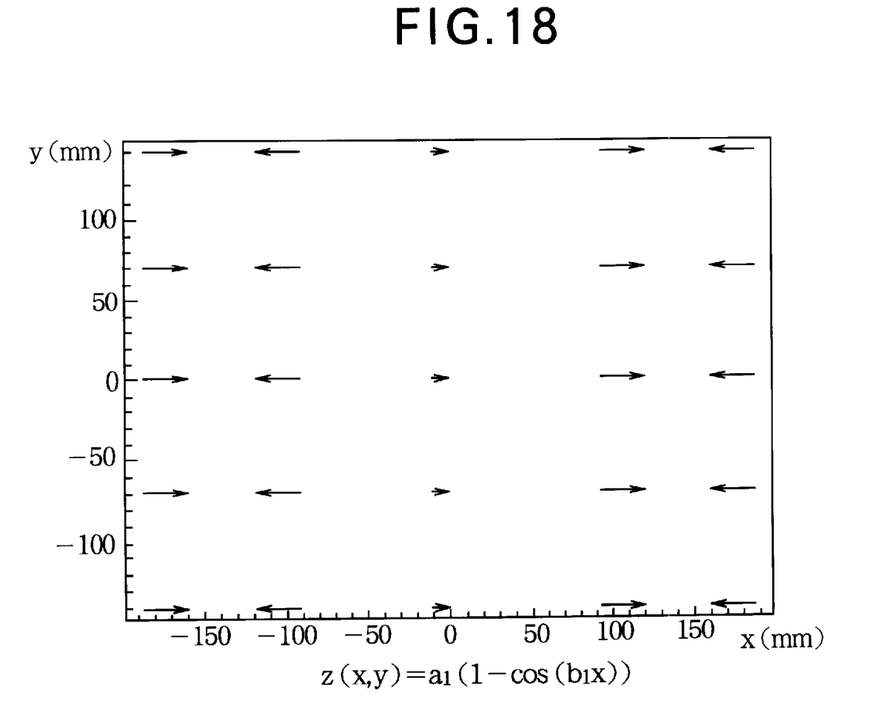
FIG. 18 illustrates the compensation pattern of the sub-lens in FIG. 17.

FIG. 18 shows the calculated compensation pattern produced by sub-lens 14A when its x- and y-axes are parallel to the x- and y-axes of the CRT faceplate 7. This compensation pattern compensates for beam-landing error of the type shown in FIG. 16, which could not be corrected in the prior art. In both the right half (x>0) and left half (x<0) of the faceplate, the direction of compensation reverses at a certain distance m from the origin (x=±m), where m depends on the constant $b_1$. The constant $a_1$ determines the magnitude of the compensation.

Figure 19:
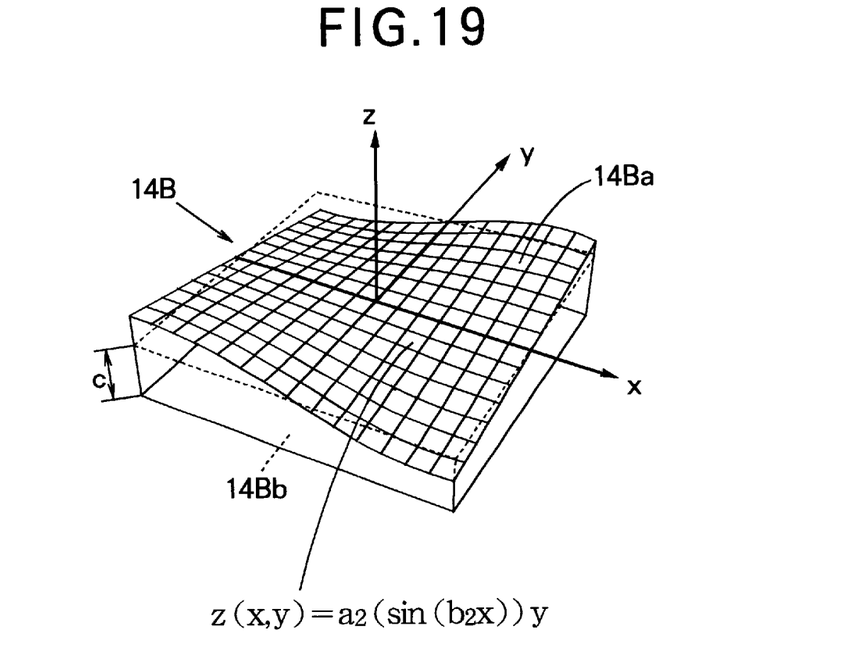
FIG. 19 illustrates a sub-lens compensating for the beam-landing pattern in FIG. 9.

FIG. 19 shows another novel sub-lens 14B employed in the invented apparatus. The upper surface 14B$a$ of this sub-lens 14B is described by the following function, in which $a_2$ and $b_2$ are constants. This function replaces the term x in the formula for prior-art sub-lens 10B with $\sin(b_2 x)$.

$$z(x, y) = a_2(\sin(b_2 x))y$$

This function is the product of a sine function in x and a non-constant linear function ($a_2 y$) in y. The lower surface 14B$b$ is flat. The thickness of sub-lens 14B at a point (x, y) is $a_2(\sin(b_2 x)) + c$.

Figure 20:
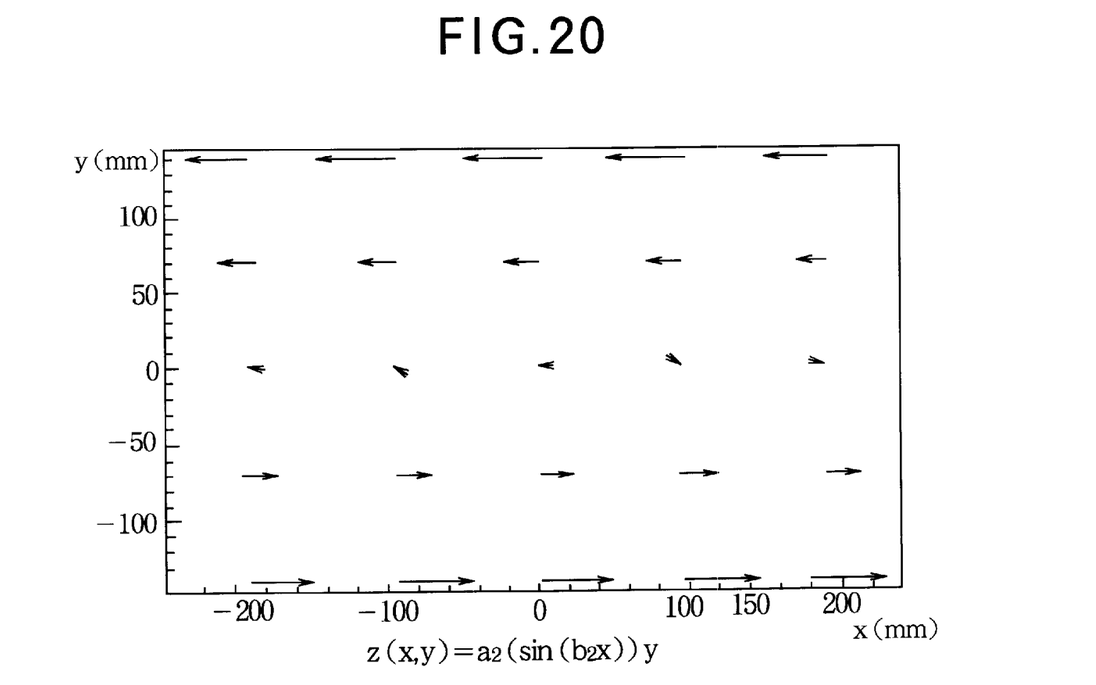
FIG. 20 illustrates the compensation pattern of the sub-lens in FIG. 19.

FIG. 20 shows the calculated compensation pattern produced by sub-lens 14B when its x- and y-axes are parallel to the x- and y-axes of the CRT faceplate 7. The pattern in FIG. 20 compensates for the shearing beam-landing error pattern shown in FIG. 9 more accurately than in the prior art, because with proper selection of the constant $b_2$, the magnitude of the compensation is substantially uniform across the top and bottom edges of the faceplate 7. The magnitude of the compensation is determined by the constant $a_2$.

Compensation for landing error patterns that combine the patterns shown in FIGS. 6, 8, 9, and 16 can be obtained by combinations of sub-lenses of the novel types 14A, 14B and prior-art type 10A described above. Compensation for the type of landing error shown in FIG. 7 can be obtained by shifting the position of the light source 1, as in the prior art.

The invented apparatus improves compensation accuracy in two ways: by substituting sub-lenses for parts of the main lens, instead of simply inserting sub-lenses where no lens or flat element was present before, so that the total thickness of the optical elements in the lens group remains substantially unchanged; and by employing sub-lenses with surface figures given by the above sine and cosine functions, which compensate better for certain beam-landing error patterns. These improvements lead to improvements in the quality of the phosphor screen 20, and thus in the quality of the picture reproduced by the CRT.

The invention is not limited to the use of sub-lenses with the specific surface configurations given above. The concept of substituting sub-lenses for part of the main lens is applicable to any set of sub-lenses.

The invented sub-lenses, shown in FIGS. 17 and 19, can also be employed in apparatus that simply inserts sub-lenses in line with the main lens and light source, instead of replacing part of the main lens. The sub-lenses may be inserted either in front of or behind the main lens.

The invention is not limited to phosphor screens of the black-stripe type, but is applicable to the manufacture of any type of phosphor screen.

The lens group is not limited to the configuration shown in the drawings. The wedge lens may be absent, or other optical elements may be present.

Those skilled in the art will recognize that further variations are possible within the scope claimed below.

What is claimed is:

1. An apparatus for exposing a faceplate of a cathode-ray tube to light following simulated electron-beam paths, thereby patterning a phosphor screen on the faceplate, having a light source and a lens group, the lens group being disposed between the light source and the faceplate, the lens group comprising:

a fixed lens having a curved surface producing the simulated electron-beam paths; and at least one replaceable optical element selected from among a flat transparent plate and a sub-lens having a curved surface, the flat transparent plate and the sub-lens having substantially identical thicknesses, the sub-lens compensating for inaccuracy of the simulated electron-beam paths produced by the fixed lens.

2. The apparatus of claim 1, further comprising:

a fixed lens mount supporting the fixed lens; and a replaceable lens mount supporting the replaceable optical element, permitting the replaceable optical element to be removed for replacement.

3. The apparatus of claim 2, wherein the replaceable lens mount simultaneously supports a plurality of replaceable optical elements as described in claim 1, permitting compensation by a combination of different sub-lenses for the inaccuracy of the simulated electron-beam paths produced by the fixed lens.

4. The apparatus of claim 1, wherein the curved surface of the sub-lens has a bilaterally symmetric cosine profile.

5. The apparatus of claim 4, wherein the curved surface of the sub-lens is describable in a Cartesian coordinate system with x, y, and z coordinates by a mathematical function of the following form, in which $a_1$ and $b_1$ are constants:

$$z(x,y) = a_1(1 - \cos(b_1 x)).$$

6. The apparatus of claim 1, wherein the curved surface of the sub-lens is generated as a product of a sine function and a non-constant linear function.

7. The apparatus of claim 6, wherein the curved surface of the sub-lens is describable in a Cartesian coordinate system with x, y, and z coordinates by a mathematical function of the following form, in which $a_2$ and $b_2$ are constants:

$$z(x,y) = a_2(\sin(b_2 x))y.$$

8. An apparatus for exposing a faceplate of a cathode-ray tube to light, thereby patterning a phosphor screen on the faceplate, having a light source for producing the light, and a main lens refracting the light to follow simulated electron-beam paths from the light source to the faceplate, comprising:

at least one sub-lens insertable in line with the main lens and the light source, having a curved surface compensating for inaccuracy of the simulated electron-beam paths produced by the main lens, the curved surface of the sub-lens having a bilaterally symmetric cosine profile.

9. The apparatus of claim 8, wherein the curved surface of the sub-lens is describable in a Cartesian coordinate system with x, y, and z coordinates by a mathematical function of the following form, in which $a_1$ and $b_1$ are constants:

$$z(x,y) = a_1(1 - \cos(b_1 x)).$$

10. An apparatus for exposing a faceplate of a cathode-ray tube to light, thereby patterning a phosphor screen on the faceplate, having a light source for producing the light, and a main lens refracting the light to follow simulated electron-beam paths from the light source to the faceplate, comprising:

at least one sub-lens insertable in line with the main lens and the light source, having a curved surface compensating for inaccuracy of the simulated electron-beam paths produced by the main lens, the curved surface of the sub-lens being generated as a product of a sine function and a non-constant linear function.

11. The apparatus of claim 10, wherein the curved surface of the sub-lens is describable in a Cartesian coordinate system with x, y, and z coordinates by a mathematical function of the following form, in which $a_2$ and $b_2$ are constants:

$$z(x,y)=a_2(\sin(b_2 x))y.$$

* * * * *